Dec. 7, 1926.
E. A. CURTIS
1,609,991
SPRING SUSPENSION FOR HORSELESS VEHICLES
Filed March 12, 1921    2 Sheets-Sheet 1
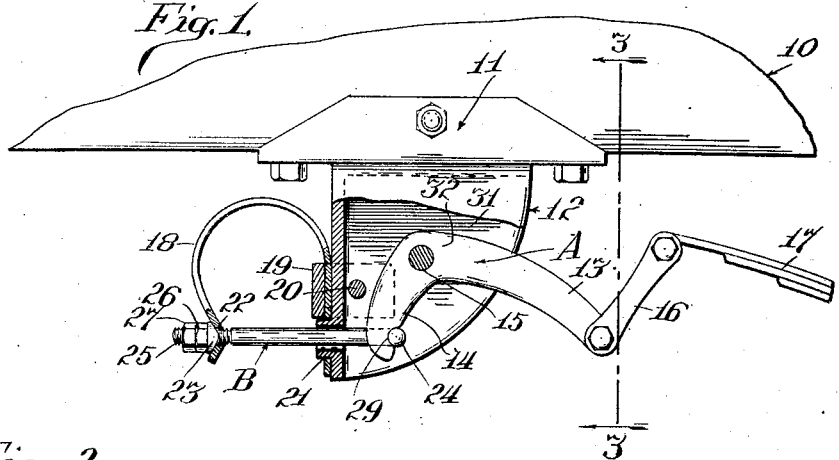
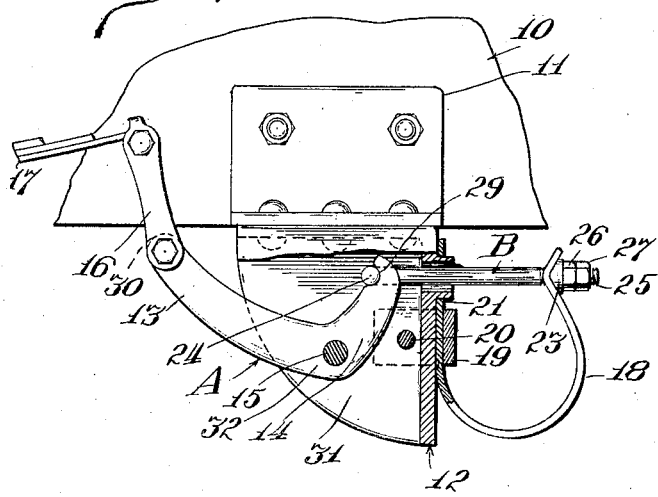
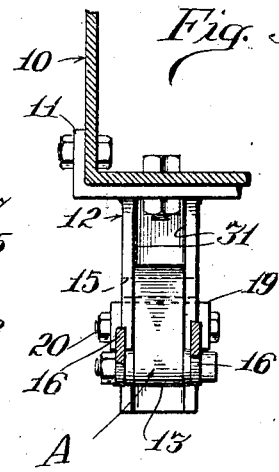
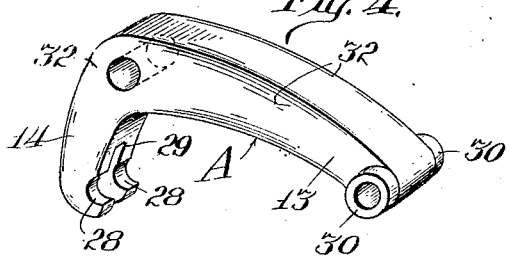
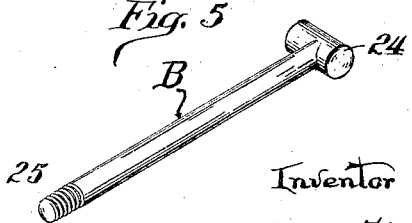
Inventor
Edmund A. Curtis Dec. 7, 1926.  1,609,991
E. A. CURTIS
SPRING SUSPENSION FOR HORSELESS VEHICLES
Filed March 12, 1921   2 Sheets-Sheet 2
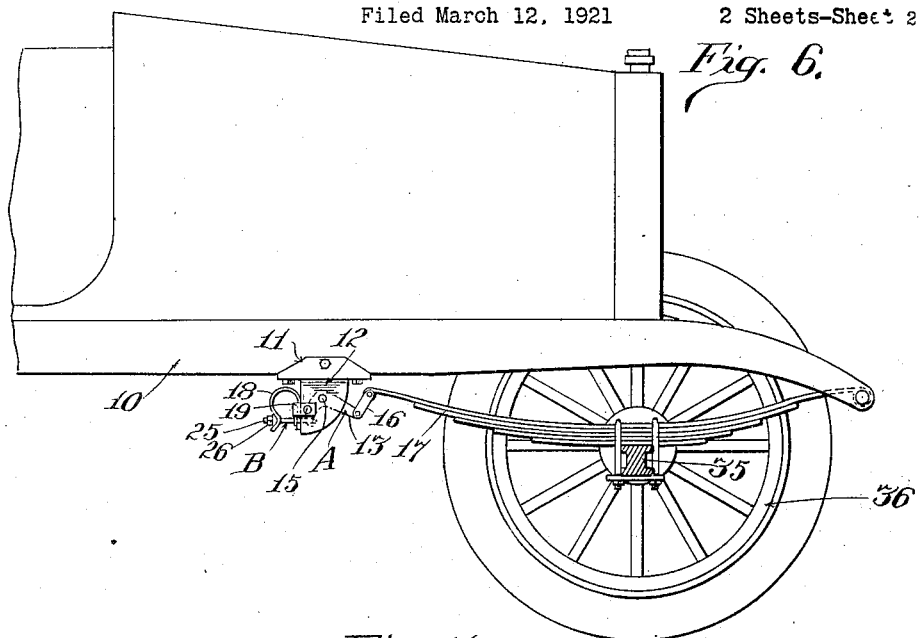
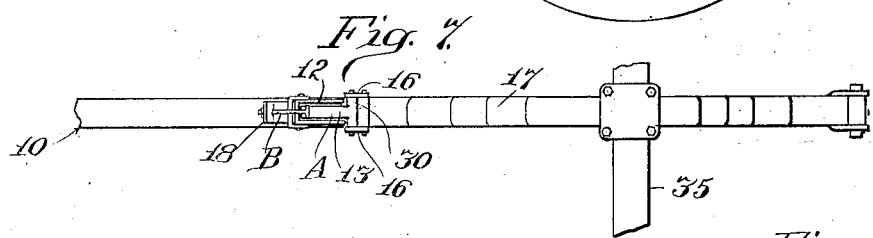
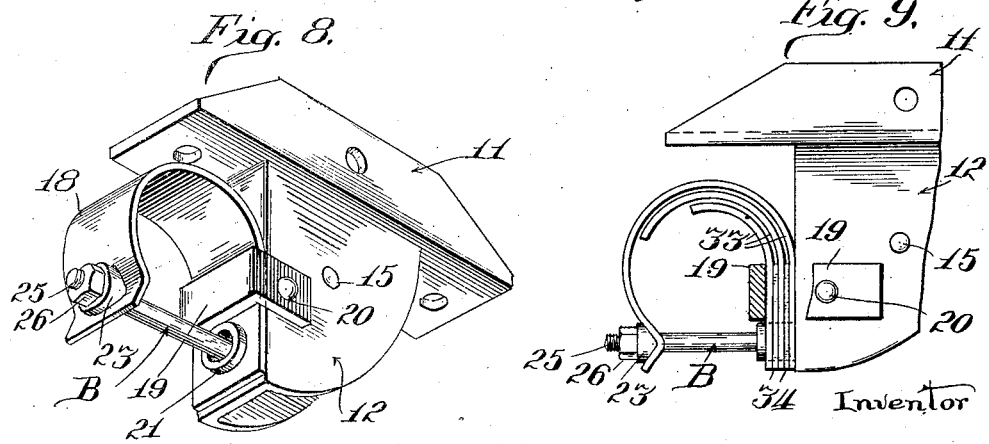
Witnesses
Milton Lenoir
Inventor
Edmund A. Curtis
By Clarence Taylor
Attorney Patented Dec. 7, 1926.

1,609,991

UNITED STATES PATENT OFFICE.

EDMUND A. CURTIS, OF CHICAGO, ILLINOIS, ASSIGNOR, BY DIRECT AND MESNE ASSIGNMENTS, TO CURTIS ENGINEERING CORPORATION, OF CHICAGO, ILLINOIS, A CORPORATION OF ILLINOIS.

SPRING SUSPENSION FOR HORSELESS VEHICLES.

Application filed March 12, 1921. Serial No. 451,710.

My invention relates to improvements in spring suspension for horseless vehicles, or the like, and the objects of my improvements are—

First, to provide a construction whereby to intercept the injurious lines of force that are the cause of roll and toss and road vibration;

Second, to afford devices whereby to transmit the vertical lines of force to horizontal movements, by means of bell crank levers;

Third, to provide spring suspension for automobiles carrying varied loads in such a manner to afford approximately the same degree of resiliency irrespective of the load, by means of supporting springs so positioned to the main spring that any given load automatically brings into action sufficient support to sustain it.

In my invention the bell crank has a lever, the fulcrum positively positioned, the load on the short end, and the service spring on the long end.

With the above, and other related objects in view, my invention consists in the novel features and in the novel combination and arrangement of parts illustrated in the accompanying drawing, forming a part of this specification, and particularly pointed out in the claims hereunto appended, it being understood that variations and modifications in the details of the invention within the scope of the claims may be resorted to without departing from the spirit or sacrificing any advantages thereof.

By showing and specifically describing one embodiment of my invention I do not intend to restrict the range of equivalents more than is made necessary by the prior state of this art.

In the drawings:

Figure 1 is an elevational diagrammatic view of the housing and connections.

Figure 2 is a similar view of the opposite side of the housing and connections.

Figure 3 is a sectional view on line 3—3 on Figure 1.

Figure 4 is a perspective view of the bell crank lever.

Figure 5 is a similar view of the compression bolt.

Figure 6 is an elevational view of the forward end of an automobile.

Figure 7 is an inverted view of the vehicle spring and connection with the housing.

Figure 8 is a perspective of the bracket and housing and the resilient member.

Figure 9 is a modified form of the bracket and housing on the resilient member.

Similar numerals refer to like parts throughout the several views.

My invention relates to spring suspension particularly to improvement in connection with the construction disclosed in my pending application Serial No. 284,395, filed March 22, 1919 (now Patent No. 1,425,839, dated August 15, 1922).

In accordance with my invention numeral 10 designates the side member of the chassis of an automobile, 11 denotes the bracket fixed to the member 10, and 12 indicates a housing in which is mounted a bell crank lever A. The lever comprising a long end indicated by the numeral 13, and a short end by the numeral 14 is mounted upon fulcrum 15, which is mounted in opposite sides of the housing 12. The shackle 16 is connected to the long end of the bell crank lever A at the front end and at the other end to service spring 17. The U-shaped main spring 18 is suitably mounted on the outer wall of the housing 12, and extends in the same vertical plane as the bell crank lever A. The strap 19 encircles the main spring 18, and is radially secured to the housing 12 by rivets 20, or other preferred means. Main spring 18 has an aperture 21, and an opening 22 at or near its outer end. The compression washer 23 is mounted on a tension bolt B having a T head 24, and a threaded end 25, on which is mounted a nut 26, and lock nut 27. The bell crank lever A in its short end has recesses 28 and recess 29 for the purpose of receiving the T head of compression bolt B. The bosses 30 on the long end of the bell crank lever A are for the purpose of providing adaptability to different widths of spring. The inner walls 31 of the housing 12, and outer walls 32 of the bell crank lever A are in sliding contact with each other. The front axle 35 is radially connected with the service spring 17, on which is mounted the wheel 36.

In Figure 9 a modified form of the main spring has supporting leaves 33, separated by shims 34. The structure in Figure 8 is termed a predetermined load construction, and in Figure 9 a varied load construction, and the primary purpose of the mechanism disclosed in Figure 9 is for use in connection with the rear axle, it being understood that the rear axle is intended to support the greater part of the entire load, and therefore I use the term—varied load member.

In construction and operation I am using a flat steel material made of the necessary shape to meet the requirements of the different weights of vehicles and the different loads said vehicles are capable of carrying.

I am prepared to reinforce this flat spring by coming to its assistance, when the strain put upon it causes it to change its shape materially, with one or more steel plates that are made of the same material and follow the contour of the original plate, without normally coming in contact with the same at all; the strain and vibration change the shape of the original plate so that the movement will bring it in contact with the reinforcements, thereby securing the necessary additional resiliency for the purpose intended.

Ordinarily in the compilation of a resilient spring where flat steel material is used, different members of parts follow each other in close contact. In this instance it must be noticed there is no contact whatever until the excess strain and load cause a movement in the original section that brings it into actual contact with the next member in series that is placed there for that purpose.

The natural lines of force in a moving vehicle travel in a horizontal plane in a rhythm which is changed only by the speed, and that change causes no harm or disturbance. It is only when the vertical lines of force attack that rhythm that any unpleasantness occurs. By means of this invention the applied leverage against the axle and disturbed elements are so controlled that in operation the moment the vehicle is in motion, my device harnesses the vertical lines of force set in action by the uneven road surface and turns them into horizontal movements in harmony with the natural lines of force.

Having thus fully described my invention, what I claim as new, and desire to secure by Letters-Patent, is:

1. In combination with a vehicle having an axle and a frame with a service spring supporting the frame on the axle, a bell crank fulcrumed on the frame with one arm connected to the service spring, and a U-shaped spring having one end secured to the frame, and the other end connected to the other arm of said bell crank, and supplemental spring members within said U-shaped spring positioned to assume a part of the load when said spring is deflected.

2. In the combination defined in claim 1, said supplemental spring members being spring leaves, each having one end clamped against the supported end of the U-shaped spring, and being separated therefrom and from each other by shims, said spring members being of different lengths and shorter than said U-shaped spring, with their free ends normally spaced therefrom.

3. In combination with a vehicle having an axle and a frame with a service spring supporting the frame on the axle, a housing secured to the frame adjacent one end of the service spring and having a pair of side plates with a transverse wall connecting them, a bell crank pivoted between said side plates, and having a longer arm and a shorter arm, together with means connecting the longer arm to the service spring, and a U-shaped spring having one end secured against said transverse wall of the housing, with a link connecting the opposite end of said spring with the shorter arm of the bell crank.

4. In combination with a vehicle having an axle and a frame with a leaf spring supporting the frame on the axle, mechanism to which one end of said leaf spring is connected, together with spring means anchored to the frame to act upon said mechanism for opposing movement thereof, the mechanism being adapted to translate the motion of the leaf spring to movement of materially smaller amplitude in a transverse direction, and said spring means being in the form of a U-shaped leaf spring having its several leaves secured together at one end and separated by shims, the leaves being of different lengths in graduated arrangement.

In testimony whereof I affix my signature.

EDMUND A. CURTIS.